(12) United States Patent
Thiele

(10) Patent No.: US 8,079,722 B2
(45) Date of Patent: Dec. 20, 2011

(54) MIRROR ASSEMBLY

(75) Inventor: Steven Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 823 days.

(21) Appl. No.: 11/965,909

(22) Filed: Dec. 28, 2007

(65) Prior Publication Data

US 2009/0116131 A1      May 7, 2009

Related U.S. Application Data

(60) Provisional application No. 60/878,313, filed on Dec. 31, 2006.

(51) Int. Cl.
*G02B 5/08* (2006.01)
(52) U.S. Cl. ......................... 359/883; 359/900
(58) Field of Classification Search .................. None
See application file for complete search history.

(56) References Cited

U.S. PATENT DOCUMENTS

| | | | |
|---|---|---|---|
| 3,978,190 A | 8/1976 | Kurz, Jr. et al. |
| 4,281,898 A | 8/1981 | Ochiai et al. |
| 4,435,042 A | 3/1984 | Wood et al. |
| 4,436,371 A | 3/1984 | Wood et al. |
| 4,826,289 A | 5/1989 | Vandenbrink et al. |
| 5,066,112 A | 11/1991 | Lynam et al. |
| 5,115,346 A | 5/1992 | Lynam |
| 5,178,448 A | 1/1993 | Adams et al. |
| 5,245,479 A | 9/1993 | Falanga |
| 5,327,288 A | 7/1994 | Wellington et al. |
| 5,448,397 A | 9/1995 | Tonar |
| 5,521,760 A | 5/1996 | De Young et al. |
| 5,659,423 A | 8/1997 | Schierbeek et al. |
| 5,669,698 A | 9/1997 | Veldman et al. |
| 5,682,267 A | 10/1997 | Tonar et al. |
| 5,808,777 A | 9/1998 | Lynam et al. |
| 5,907,430 A | 5/1999 | Taylor et al. |
| 6,102,546 A | 8/2000 | Carter |
| 6,124,886 A | 9/2000 | DeLine et al. |
| 6,449,082 B1 | 9/2002 | Agrawal et al. |
| 6,773,124 B2 | 8/2004 | Marusawa et al. |
| 6,877,867 B1 | 4/2005 | Murakami |
| 6,934,067 B2 | 8/2005 | Ash et al. |

(Continued)

OTHER PUBLICATIONS

U.S. Utility Patent Appln. for: Prismatic Mirror, filed Dec. 28, 2007, U.S. Appl. No. 11/966,038.

(Continued)

*Primary Examiner* — Jennifer L. Doak
(74) *Attorney, Agent, or Firm* — Mark E. Duell, Esq.; Emerson Thomson & Bennett, LLC

(57) ABSTRACT

A mirror assembly in one embodiment may include a first conductive member that is substantially transparent, a second conductive member that comprises a reflective portion, a third conductive member that is operatively connected to the first conductive member and the second conductive member, a front portion that is substantially transparent and that is formed by injecting a first thermoplastic material into a mold on a first side of the first conductive member, an inner portion that is formed by injecting a second thermoplastic material into the mold on a second side of the second conductive member, and a back portion that is substantially opaque and that is formed by injecting a third thermoplastic material into the mold on the second side of the second conductive member. The front portion and the back portion together may substantially encompass a first perimeter of the first conductive member and a second perimeter of the second conductive member.

17 Claims, 15 Drawing Sheets

U.S. PATENT DOCUMENTS

| | | | |
|---|---|---|---|
| 6,954,300 | B2 | 10/2005 | Varaprasad et al. |
| 6,963,439 | B2 | 11/2005 | Tonar |
| 7,004,592 | B2 | 2/2006 | Varaprasad et al. |
| 7,009,751 | B2 | 3/2006 | Tonar et al. |
| 7,025,469 | B1 | 4/2006 | Manfre' et al. |
| 7,083,312 | B2 | 8/2006 | Pastrick et al. |
| 7,086,683 | B2 | 8/2006 | Radu et al. |
| 7,108,409 | B2 | 9/2006 | DeLine et al. |
| 2004/0264011 | A1 | 12/2004 | Lynam |
| 2005/0134983 | A1 | 6/2005 | Lynam |
| 2006/0007550 | A1 | 1/2006 | Tonar et al. |
| 2006/0050356 | A1 | 3/2006 | Varaprasad et al. |

OTHER PUBLICATIONS

Fosta-Tek Optics, Optical Molding Services, Dec. 18, 2006, http://www.fosta-tek.com/molding.html, pp. 1-2.

Injection Molded Plastics: Automotive Information, Dec. 18, 2006, http://www.thomasnet.com/heading.html?cov=EM&what=Injection+Molded+Plastics%3 . . . , pp. 1-2.

MIRROR ASSEMBLY

This application claims priority from U.S. Ser. No. 60/878,313 titled MIRROR ASSEMBLY, filed Dec. 31, 2006, which is incorporated herein by reference.

I. BACKGROUND OF THE INVENTION

A. Field of Invention

This invention pertains to the art of methods and apparatuses regarding mirror assemblies, and more specifically to methods and apparatuses regarding a day/night mirror assembly for a vehicle.

B. Description of the Related Art

It is known in the art of automotive mirror assemblies to provide a vehicle with electrochromic mirrors. With reference to FIGS. 1 and 2, current automobile day/night exterior mirrors use an electrochromic material positioned between two substantially parallel plates of glass. Typically, electrochromic mirrors used in the automotive and other transportation industries are made using two conductors facing inwards and in contact with an electrochromic material. The inward facing surface of one piece of glass is coated with a transparent conductive coating in contact with the electrochromic material. The inward facing surface of the second piece of glass is coated with a reflective conductive coating in contact with the electrochromic material. Seals are positioned between the glass plates to enclose the electrochromic material. Many methods may be used to form or position busbars around the edges of both pieces of glass, including wrapping a conductor from the one side of the glass, onto the edge, and around the opposite surface. Conductive busbars may also be be limited to one surface of the glass. As shown in FIG. 2, these parts must be assembled together and then packaged in a bezel with wires and a coupler connected. This is expensive and creates a large black bezel ring around the glass that does not look attractive.

While such known mirror assemblies work well for their intended purpose, improvements are greatly desirable. One desirable improvement would be to make a mirror assembly more light weight. Another would be to improve the manufacturability by eliminating multiple assembly steps required to assemble the mirror. Still another desirable improvement would be to improve the appearance by eliminating the large bezel shape around the outside edge of the mirror. Yet another desirable improvement would be to increase the styling freedom in choosing a mirror shape and/or curvature.

II. SUMMARY OF THE INVENTION

According to one embodiment of this invention, a mirror assembly comprises a first conductive member having a first side, a second side, a first perimeter, and a first busbar, wherein the first conductive member is substantially transparent, a second conductive member having a first side, a second side, a second perimeter, and a second busbar, wherein the second conductive member comprises a reflective portion, a third conductive member that is operatively connected to the first conductive member and the second conductive member and that is substantially transparent, a front portion that is substantially transparent and that is formed by injecting a first thermoplastic material into a mold on the first side of the first conductive member, an inner portion that is substantially transparent and that is formed by injecting a second thermoplastic material into the mold on the second side of the second conductive member, and a back portion that is substantially opaque and that is formed by injecting a third thermoplastic material into the mold on the second side of the second conductive member, wherein the front portion and the back portion together substantially encompass the first perimeter and the second perimeter.

According to another embodiment of this invention, the mirror assembly further comprises a scratch resistant material covering at least a portion of the front portion.

According to another embodiment of this invention, the mirror assembly further comprises the back portion being formed within the mold to have an electrical connection that is operatively connected to the first and second busbars.

According to another embodiment of this invention, the first thermoplastic material is a first polycarbonate material, the second thermoplastic material is a second polycarbonate material, and the third thermoplastic material is a third polycarbonate material.

According to another embodiment of this invention, the back portion substantially encompasses the first perimeter of the first conductive member and the second perimeter of the second conductive member and seals the assembly.

According to another embodiment of this invention, the front portion substantially encompasses the first perimeter of the first conductive member and the second perimeter of the second conductive member and seals the assembly.

According to another embodiment of this invention, the back portion is formed within the mold to have a first attachment portion for use in attaching the device to a vehicle.

According to another embodiment of this invention, a method of forming a mirror assembly comprises the steps of (a) inserting a first conductive member into a mold, wherein the first conductive member comprises a first busbar and a first perimeter, wherein the first conductive member is substantially transparent when the mirror assembly is used, (b) inserting a first thermoplastic material into the mold to form a front portion on a first side of the first conductive member, wherein the front portion is substantially transparent when the mirror assembly is used, (c) inserting a second conductive member into the mold, wherein the second conductive member comprises a second busbar, a second perimeter, and a reflective portion when the mirror assembly is used, (d) inserting a second thermoplastic material into the mold to form an inner portion on a second side of the second conductive member, wherein the inner portion is substantially transparent when die mirror assembly is used, (e) inserting a third conductive member into the mold wherein the third conductive member is operatively connected to the first conductive member and the second conductive member and is substantially transparent, and (f) inserting a third thermoplastic material into the mold on the second side of the second conductive member to form a back portion, wherein the back portion is substantially opaque when the mirror assembly is used, wherein the front portion and the back portion together substantially encompass the first perimeter and the second perimeter.

One advantage of this invention is that a mirror assembly has a better appearance than currently known. This better appearance comes from eliminating the large bezel shape around the outside edge of the mirror.

Another advantage of this invention is that a mirror assembly can be made in a less expensive manner because the multiple assembly steps currently required are greatly reduced.

Another advantage of this invention is that a mirror assembly can be made with less weight with the use of polycarbonate materials having about half the density of float glass.

Yet another advantage of this invention is that a mirror assembly can be applied to more vehicles than currently possible.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
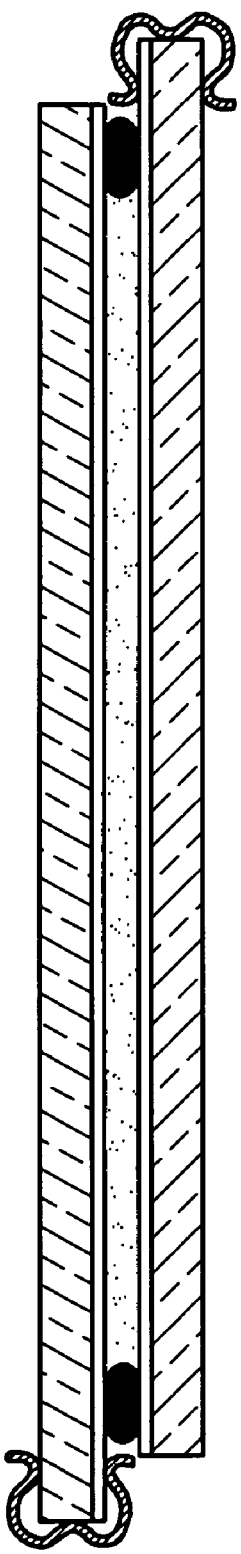
FIG. 1 is a sectional side view of a prior art mirror assembly.
Figure 2:
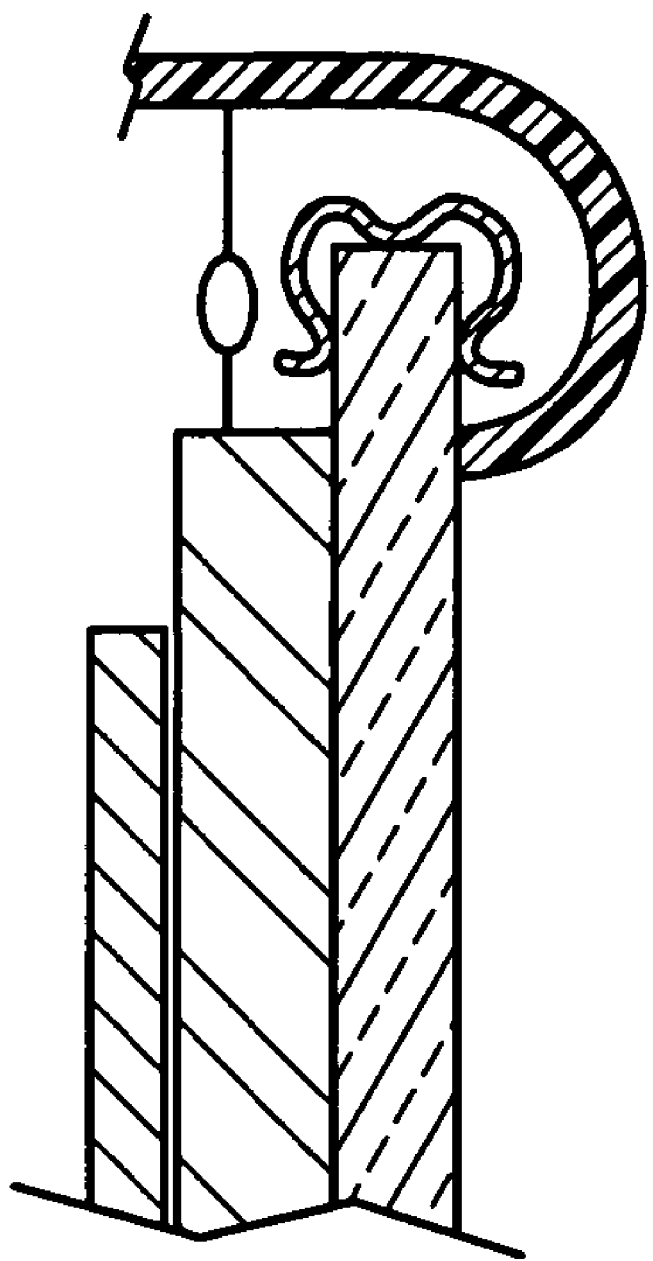
FIG. 2 is an enlarged sectional view taken from FIG. 1, showing the bezel.
Figure 3:
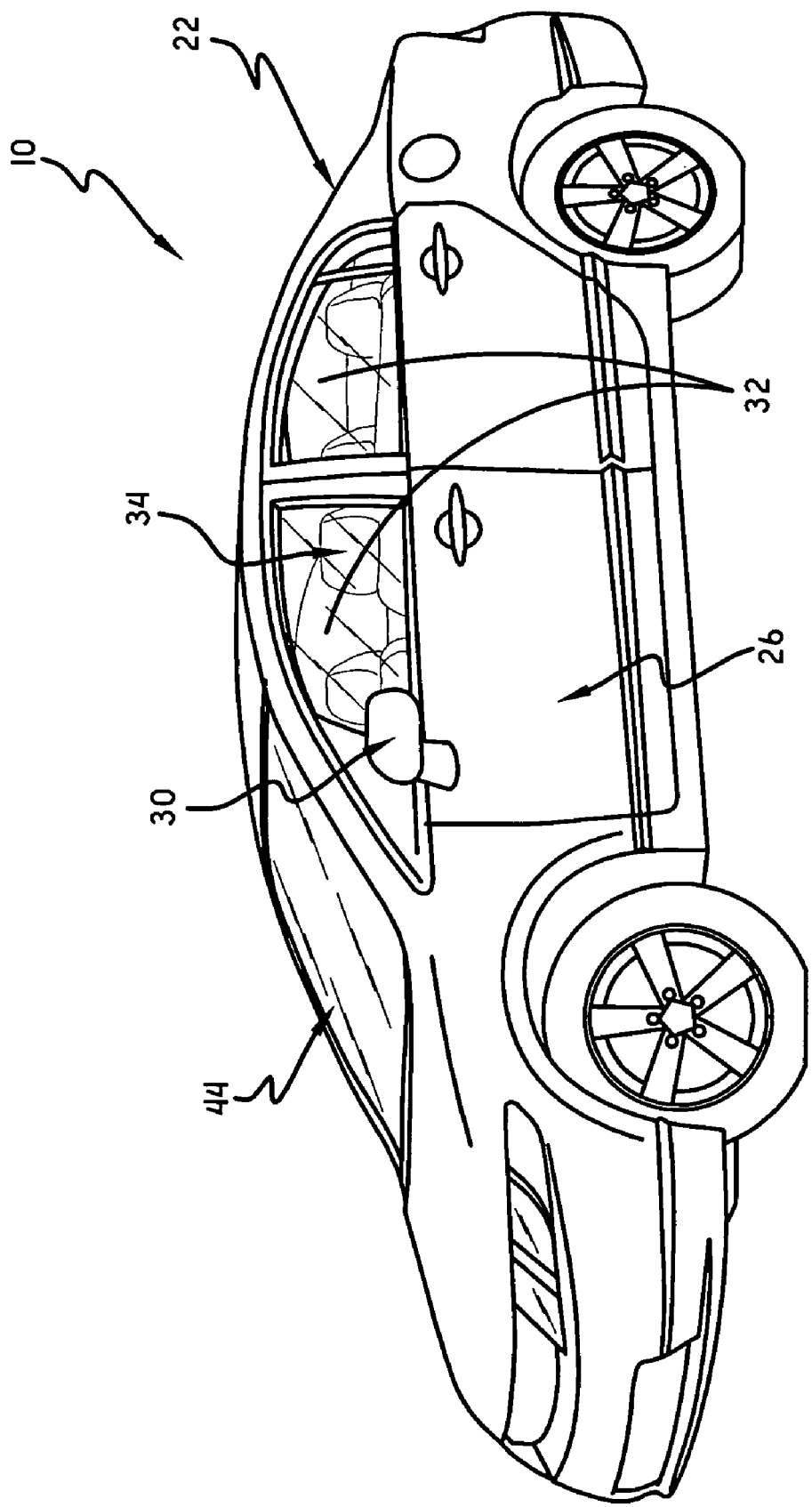
FIG. 3 is a side perspective view of a vehicle exterior equipped with an exterior mirror assembly according to one embodiment of this invention.
Figure 4:
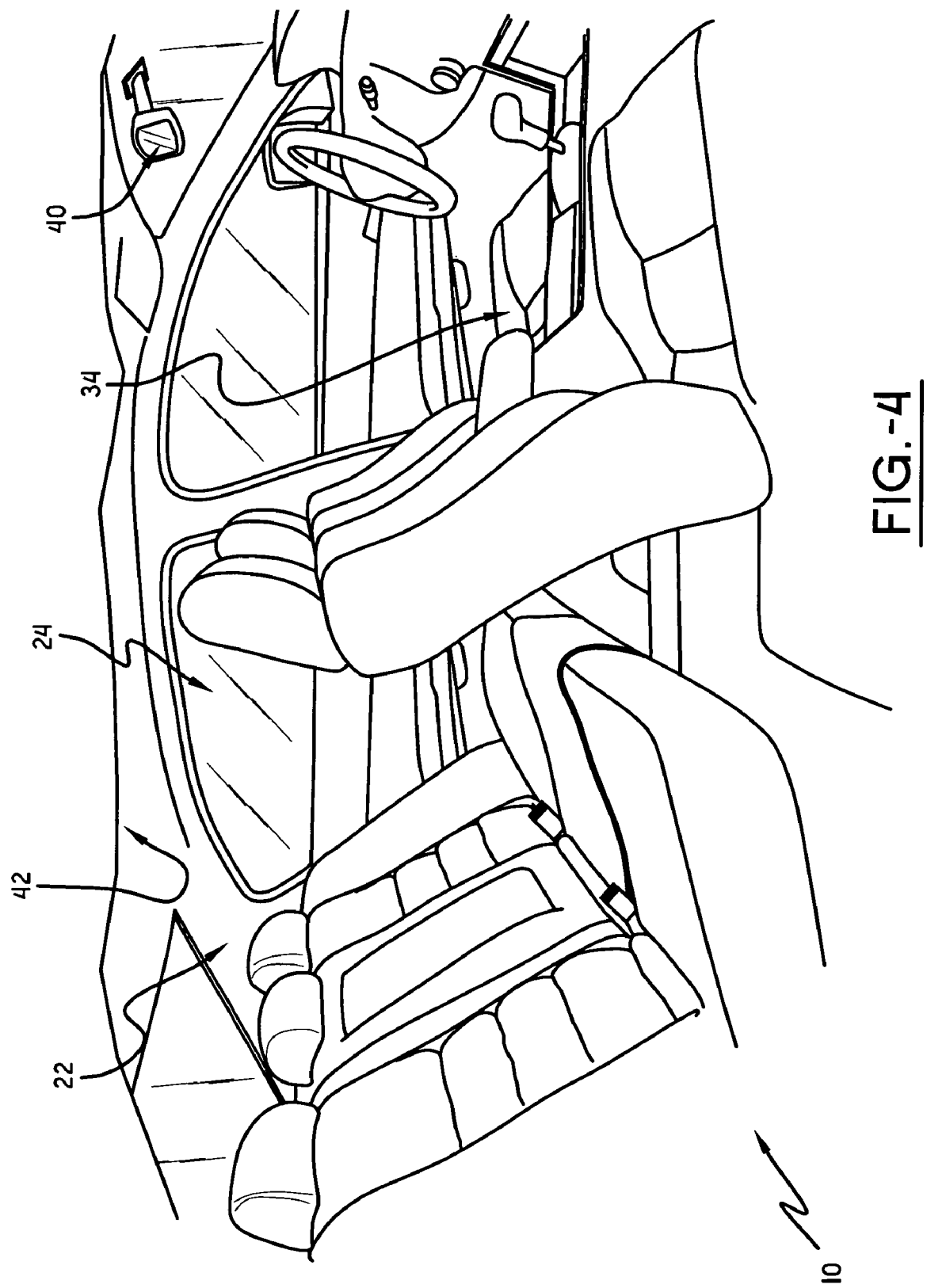
FIG. 4 is a side perspective view of a vehicle interior showing an interior mirror assembly according to another embodiment of this invention.
Figure 11:
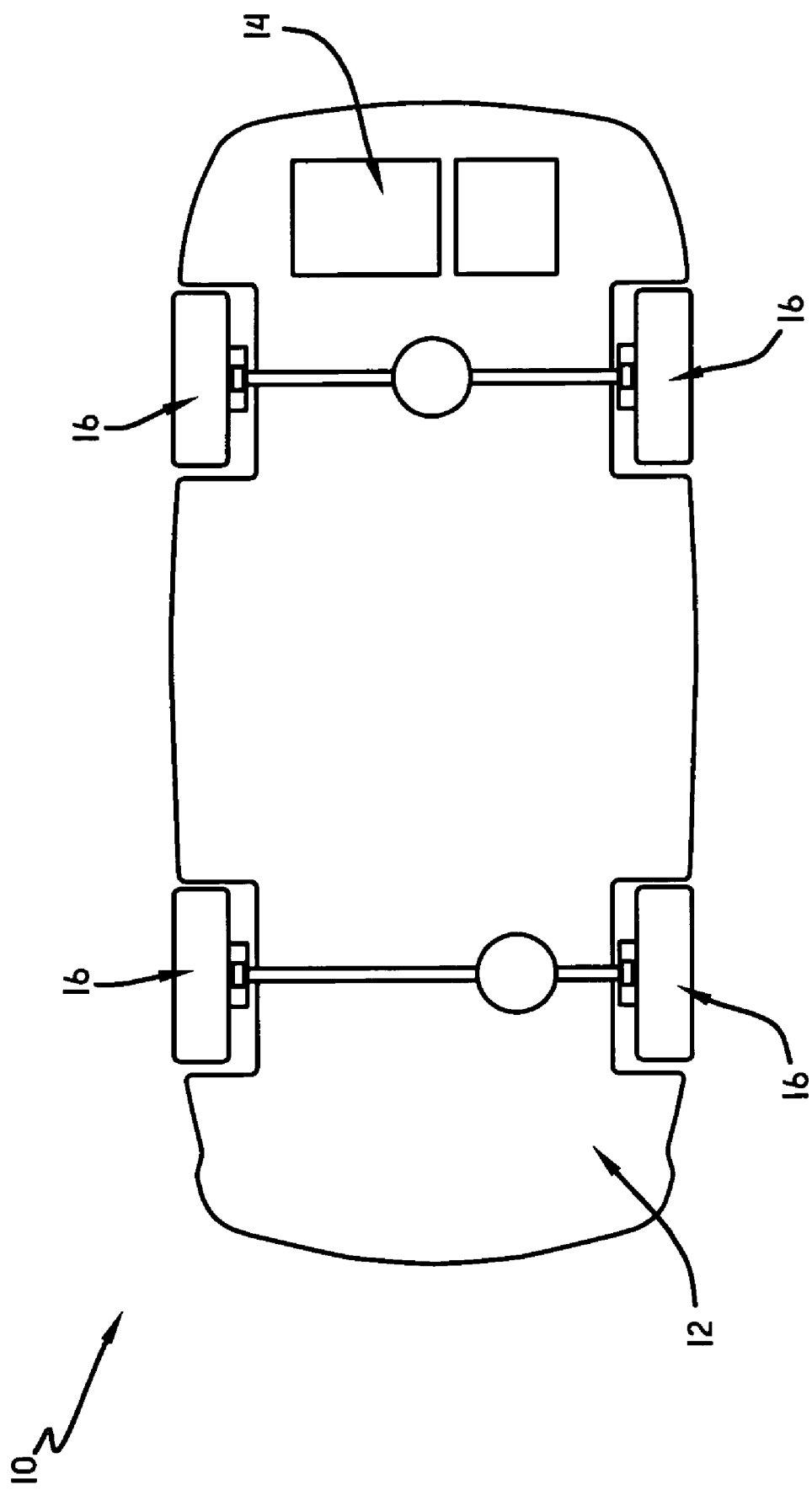
FIG. 11 is a schematic bottom view of vehicle.

Referring now to the drawings wherein the showings are for purposes of illustrating embodiments of the invention only and not for purposes of limiting the same, FIG. 3 shows a vehicle 10 equipped with an exterior mirror assembly 30 according to one embodiment of this invention and FIG. 4 shows a vehicle 10 equipped with an interior mirror assembly 40 according to another embodiment of this invention. It should be noted that one or more exterior mirror assemblies 30 and one or more interior mirror assemblies 40 can be attached to the same vehicle. As shown in FIG. 11, each vehicle 10, as is well known in the art, may include a frame 12, a drive train including an engine 14 mounted to the frame 12, and one or more ground engaging wheels 16 which are operatively attached to the frame 12 and are used to provide locomotion for the vehicle 10. As shown in FIGS. 3-4, each vehicle 10 may also include a body 22 defining a passenger compartment 24. One or more doors 26, 28 may provide entry into the passenger compartment 24 in any manner known in the art. It should be understood that while the vehicles shown are passenger cars, this invention will work well with any vehicle including, but not limited to, cars, trucks, sport utility vehicles, cross-over vehicles, motorcycles, off-road vehicles, all-terrain vehicles, and airplanes as well as other passenger carrying devices such as boats. This invention may also work well in non-vehicle applications.

Figure 5:
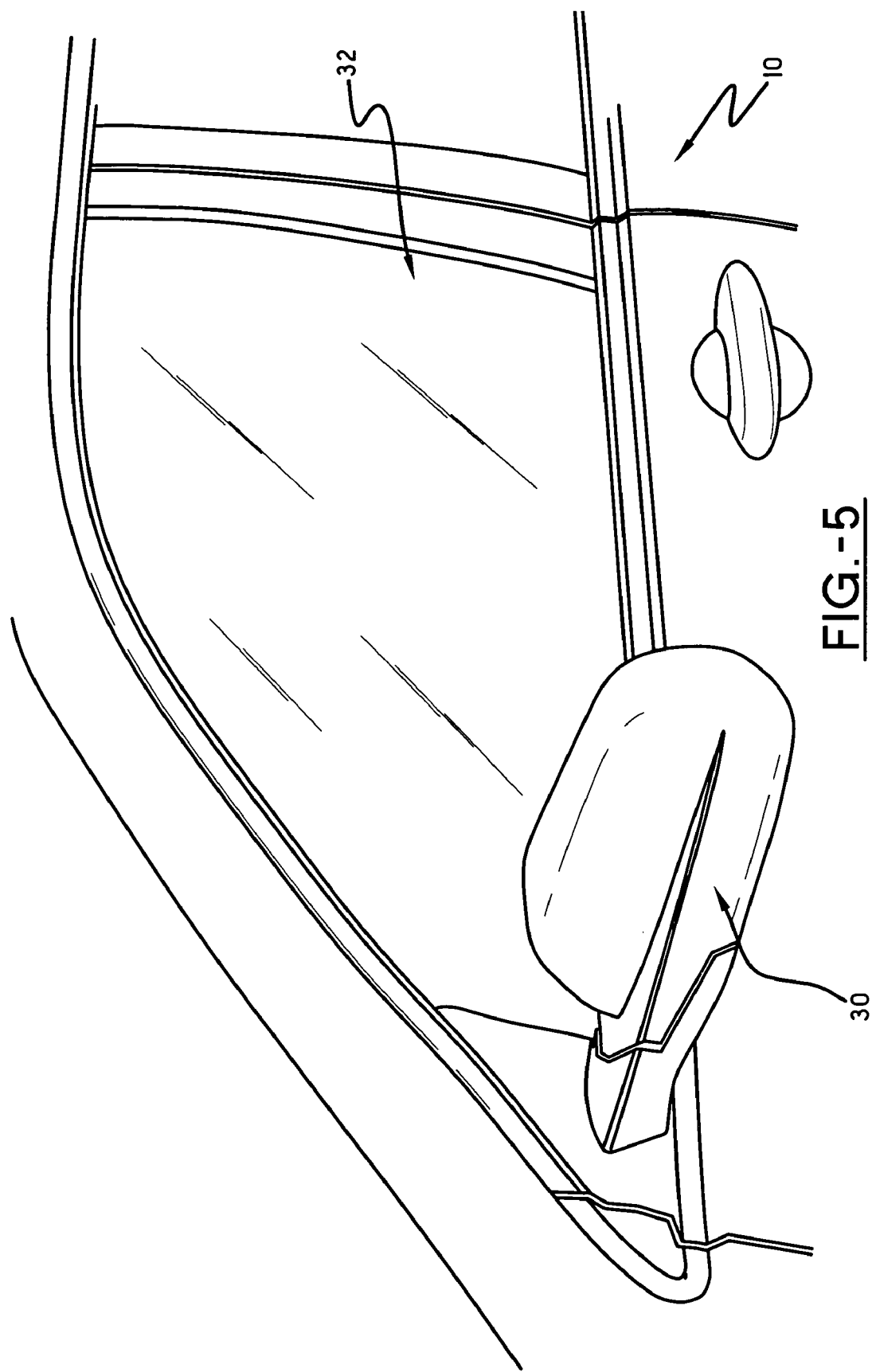
FIG. 5 is a side perspective view of a vehicle exterior showing an exterior mirror assembly according to another embodiment of this invention.
Figure 12:
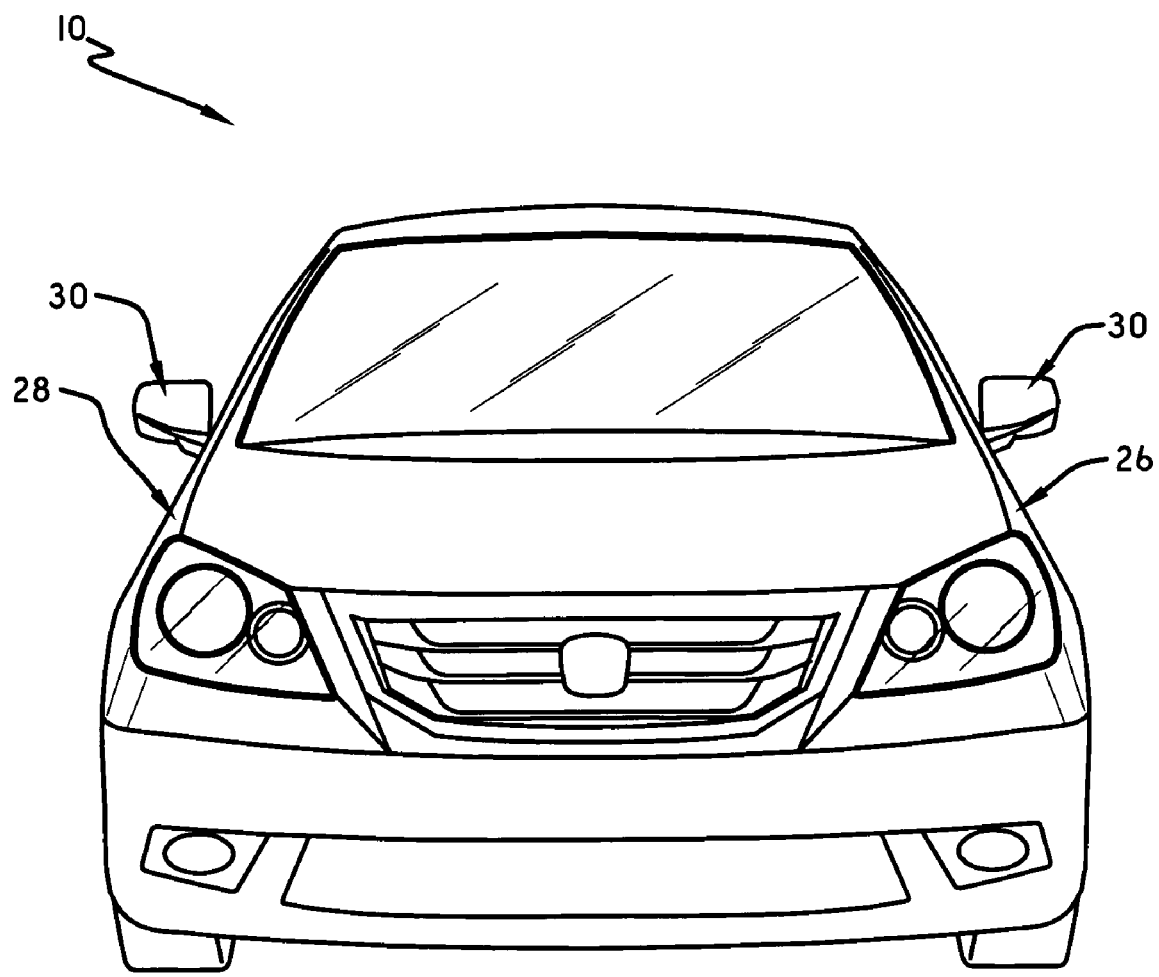
FIG. 12 is a front perspective view of a vehicle exterior showing a pair of exterior mirrors according to one embodiment of this invention.
Figure 13:
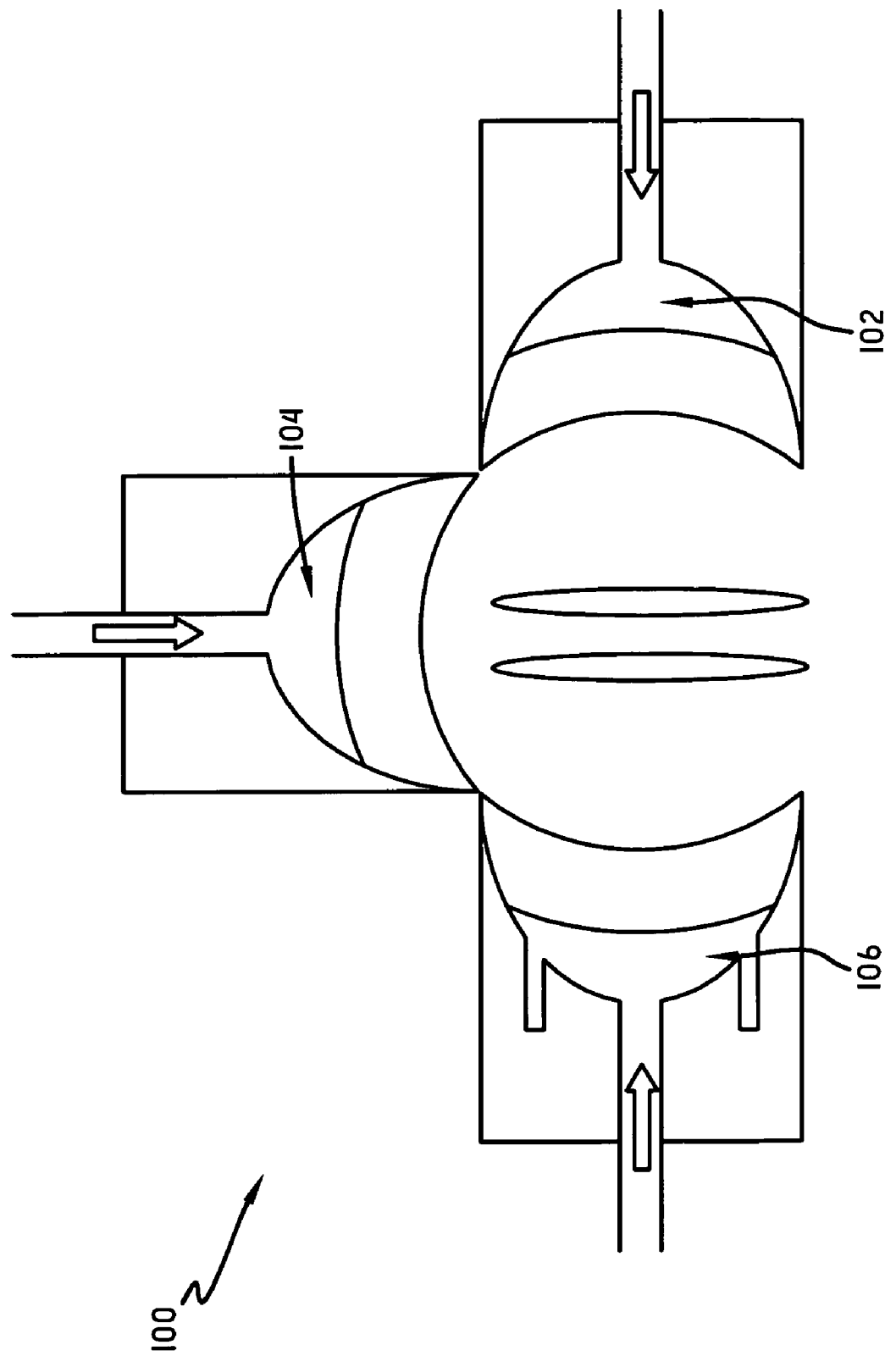
FIG. 13 is a schematic view of a mold that may be used according to one embodiment of this invention.

With reference now to FIGS. 3, 5 and 12, the exterior mirror assembly 30 may extend from an outer surface of the vehicle 10 body 22 such as, in one embodiment, from either of the driver side door 26 or the passenger side door 28. In another embodiment, as shown in FIG. 12, a separate exterior mirror assembly 30 may extend from each door 26, 28. The exterior mirror assembly 30 may be positioned near any one of the passenger compartment windows 32 or windshield 44 so that the operator can easily view the exterior mirror assembly 30 from the driver's seat 34 in order to better view objects exterior to the vehicle 10.

Figure 6:
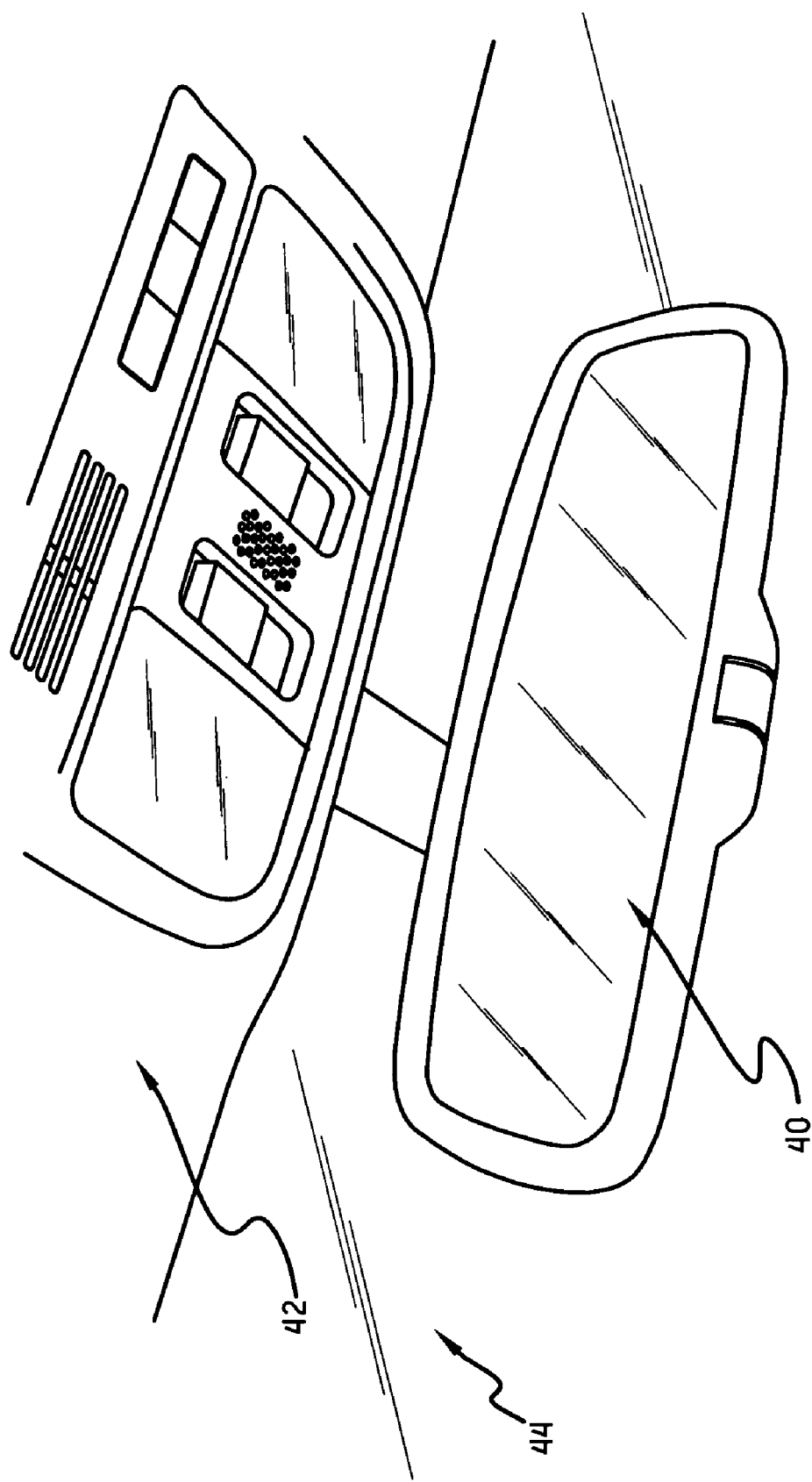
FIG. 6 is a perspective view of a vehicle interior showing an interior mirror assembly according to another embodiment of this invention.
Figure 7:
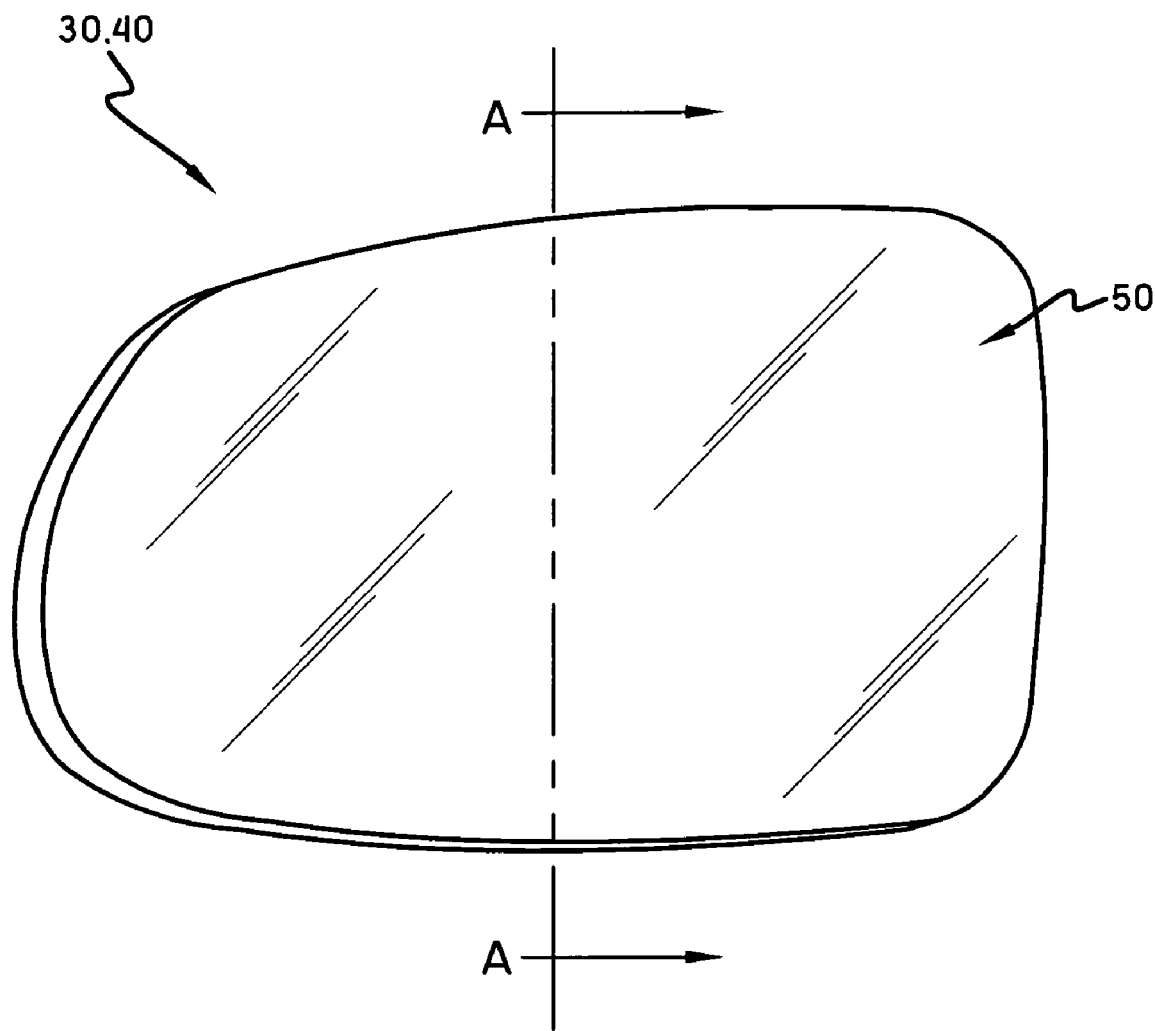
FIG. 7 is a front view of a mirror assembly made according to one embodiment of this invention.

With reference now to FIGS. 3-4 and 6, the interior mirror assembly 40 may extend from an inner surface of the vehicle 10 body 22 such as, in one embodiment, from a ceiling 42 of the passenger compartment 24, or in another embodiment, from a front windshield 44 of the passenger compartment 24. The interior mirror assembly 40 may be positioned so that the operator can easily view the interior mirror assembly 40 from the driver's seat 34 in order to better view objects within or exterior to the vehicle 10.

With reference now to FIGS. 7-10, each mirror assembly, whether exterior mirror assembly 30 or interior mirror assembly 40, may include a front portion 50, a first conductive member 110, a second conductive member 130, a third conductive member 150, an inner portion 170, and a back portion 90. The front portion 50 may be formed of a substantially transparent thermoplastic material. In one embodiment, the front portion 50 is formed from a substantially clear polycarbonate material, as will be discussed further below. The inner portion 170 may be formed of a substantially transparent thermoplastic material. In one embodiment, the inner portion 170 is formed from a substantially clear polycarbonate material, as will be discussed further below. The back portion 90 may be formed of a substantially opaque thermoplastic material. In one embodiment, the back portion 90 is formed from a substantially opaque polycarbonate material. In another embodiment, the back portion 90 includes one or more integrated attachment features 80 (see FIG. 8) for use in attaching the mirror assemblies 30, 40 to the vehicle 10.

With continuing reference to FIGS. 7-10, the first conductive member 110 may have a first side 112 and a second side 114. In one embodiment, first conductive member 110 is generally planar in shape. The first conductive member 110 may be substantially transparent. In one embodiment, the conductive member 110 has a photo transmittance from about 10 to 100 percent in the visible light region. In another embodiment, the conductive member 110 is a thin film of gold, silver, chrome, copper, tungsten, or any other conductive material chosen within sound engineering judgment. In another embodiment, the first conductive member 110 is an electrically conductive thin film of metal oxide or oxides, including, for example, one or more of the following materials: tin oxide, indium tin oxide, fluorine doped tin oxide, silver oxide, zinc oxide, and vanadium oxide. In one embodiment, the film thickness is within the range of 10 to 1,000 nanometers (NM) and the surface resistance of the film is within the range of 1 to 100 ohms/square. Any suitable method of forming the conductive member 110 may be used depending on the type of metals or metal oxides used, including vacuum deposition, ion-plating, sputtering, and sol-gel methods. The first conductive member 110 may include a first busbar 116 for use in conducting electricity from a wire harness 120 to the first conductive member 110. The first busbar 116 may be made from any conductive material chosen with sound engineering judgment. The first busbar 116 may be connected to the first conductive member 110 in any manner chosen within sound engineering judgment.

Still referring to FIGS. 7-10, the second conductive member 130 may have a first side 132 and a second side 134. In one embodiment, the second conductive member 130 is generally planar in shape. The second conductive member 130 may be substantially reflective for use in reflecting light in a known manner. In one embodiment, the second conductive member 130 has a mirror surface and is electrochemically stable in performance as an electrode. In another embodiment, the second conductive member 130 is a thin metal film of gold, platinum, tungsten, tantalum, rhenium, osmium, iridium, silver, nickel, aluminum, palladium, or chrome. In yet another embodiment, the second conductive member 130 is an alloy film of platinum-palladium, platinum-rhodium, nickel chrome, or stainless steel. The second conductive member 130 may include a busbar 136 for use in conducting electricity from a wire harness 120 to the second conductive member 130. The second busbar 136 may be made from any conductive material chosen with sound engineering judgment. The second busbar 136 may be connected to the first conductive member 110 in any manner chosen within sound engineering judgment.

With continuing reference to FIGS. 7-10, the third conductive member 150 may be a substantially transparent electrically conductive material. The third conductive member 150 may be in a liquid, gel, paste, or solid form. In one embodiment, the third conductive member 150 is a substantially transparent electrochromic liquid known in the art. An electrochromic liquid may be prepared by dissolving an electrolyte including salts, acids, or alkalis into a solvent. In another embodiment, the third conductive member 150 is an electrochromic gel known in the art. An electrochromic gel may be prepared by blending a polymer or a gelatinizer with an electrochromic liquid. In another embodiment, the third conductive member 150 is a transparent electrochromic solid known in the art. An electrochromic solid includes a substance that is solid at room temperature and has an ion conductivity. Some examples of an electrochromic solid are polyethyleneoxide, a polymer of oxyethylenemethacrylate, nafion, or polystyrene sulfonate. The third conductive member 150 may be in electrical contact with the second side 114 of the first conductive member 110 and the first side 132 of the second conductive member 130.

Figure 14:
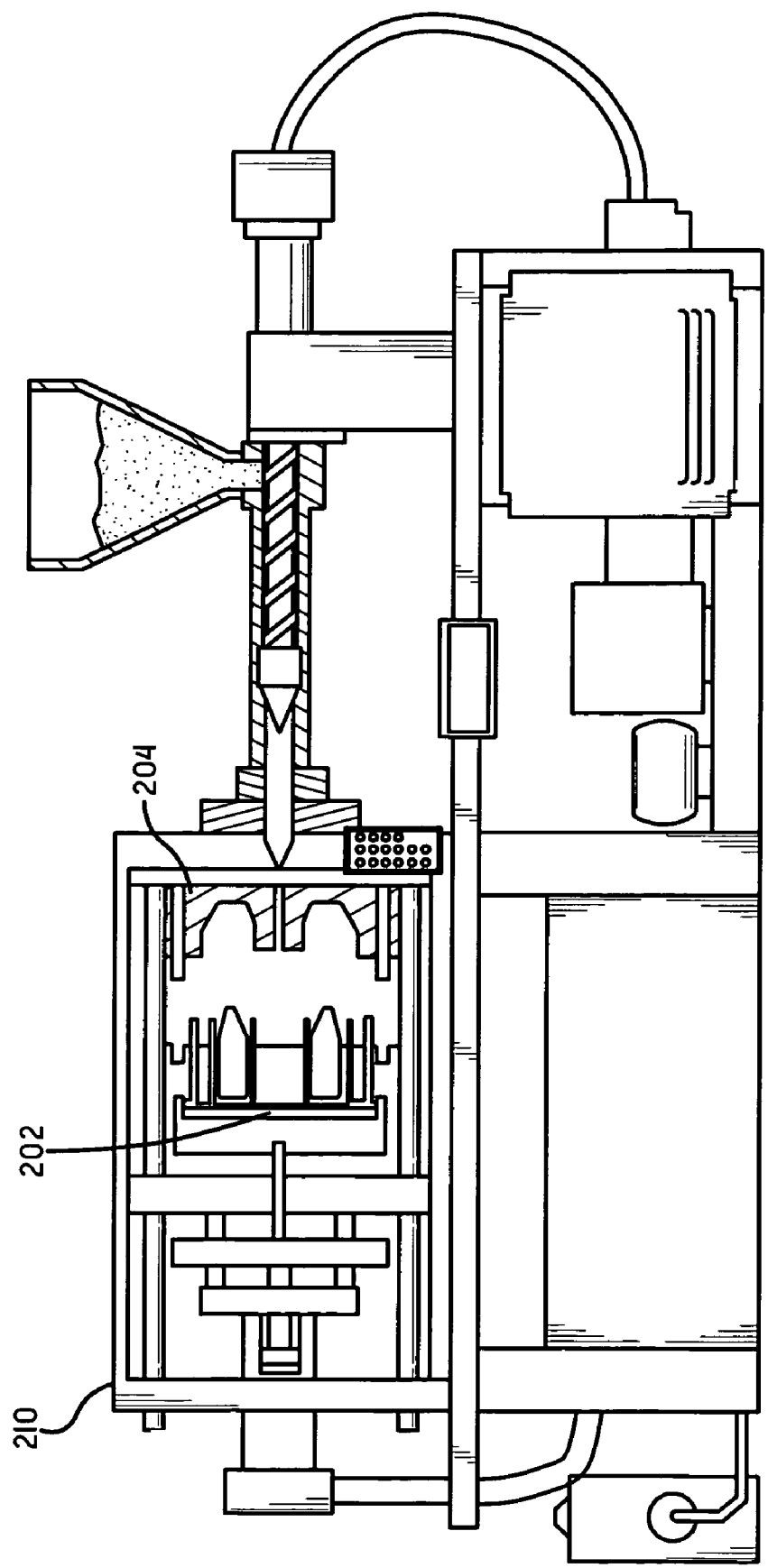
FIG. 14 is a perspective view of an injection molding apparatus.
Figure 15:
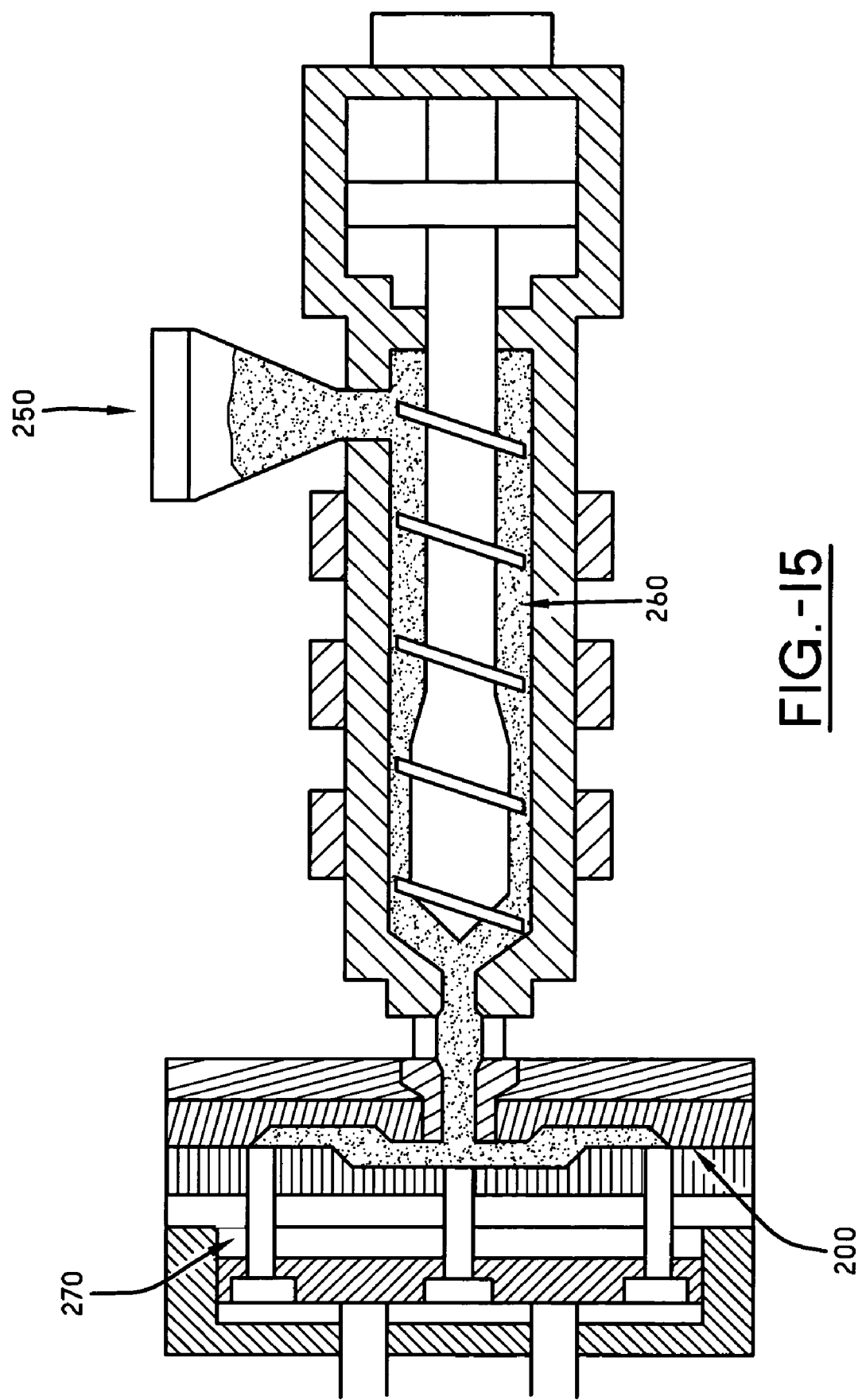
FIG. 15 is a perspective view of an injection molding apparatus.

With reference now to FIGS. 14-15, it is noted that the process of injection molding is well known in the art and thus will only be described briefly here. In general, injection molding is a manufacturing technique for making objects from a thermoplastic material 260. The injection molding process may require the use of a production tooling, commonly referred to as a mold 200, and an injection-molding machine, also known as a press 210. The mold 200 commonly comprises at least a first section 202 and a second section 204. The mold 200 may be constructed in the inverse of the particular shape desired. A press 210 may hold the mold 200 closed while a thermoplastic material 260 such as acrylonitrile butadiene styrene (ABS), polypropylene, polyethylene, or polycarbonate is injected into the mold 200. The thermoplastic material 260 may be formed by melting a resin 250. Commonly, the resin 250 may be in pellet or granule form and melted by heat and shearing forces shortly before injection into the mold 200. After injection, the mold 200 may be cooled and the part extracted. Extraction may be by the use of extractor pins 270, air or any method chosen with sound engineering judgment. Injection-molded thermoplastic provides a relatively lightweight object with superior strength and durability in nearly any weather condition. Construction of the mirror assemblies 30, 40 is not limited to the method described herein, and may be constructed using any method chosen with sound engineering judgment.

With reference again to FIGS. 7-10, various methods for forming a mirror assembly 30, 40 according to various embodiments of this invention will now be described. First, the first conductive member 110 may be placed into a mold 100. The front portion 50 may then be formed by inserting a first thermoplastic material 102 into the mold 100 on the first side 112 of the first conductive member 110. The front portion 50 may be substantially transparent or clear. The first thermoplastic material 102 may be a polycarbonate. In another embodiment, the first thermoplastic material 102 may be any thermoplastic chosen within sound engineering judgment. In a more specific embodiment, the first thermoplastic material 102 may be inserted into the mold using an injection molding process. In one embodiment, the front portion 50 adheres to at least a portion of the first side 112 of the first conductive member 110.

With continuing reference to FIGS. 7-10, the second conductive member 130 may then be placed into the mold 100. The inner portion 170 may then be formed by inserting a second thermoplastic material 104 into the mold 100 on the second side 134 of the second conductive member 130. The inner portion 170 may be substantially transparent or clear. The second thermoplastic material 104 may be a polycarbonate. In another embodiment, the second thermoplastic material 104 may be any thermoplastic chosen within sound engineering judgment. In a more specific embodiment, the second thermoplastic material 104 may be inserted into the mold using an injection molding process. In one embodiment, the inner portion 170 adheres to at least a portion of the second side 134 of the second conductive member 130.

With continuing reference to FIGS. 7-10, the third conductive member 150 may then be inserted into the mold 100 between the second side 114 of the first conductive member 110 and the first side 132 of the second conductive member 130. The third conductive member 150 is in electrical contact with both the first conductive member 110 and the second conductive member 130. In one embodiment, the third conductive member 150 is in physical contact with both the first conductive member 110 and the second conductive member 130.

Still referring to FIGS. 7-10, the back portion 90 may then be formed by inserting a third thermoplastic material 106 into the mold 100 on a second side 134 of the second conductive member 130. The back portion 90 may be opaque having any desired color or colors as is known in the art. The third thermoplastic material 106 may be a polycarbonate. In another embodiment, the third thermoplastic material 106 may be any thermoplastic chosen within sound engineering judgment. In a more specific embodiment, the third thermoplastic material 106 may be inserted into the mold 100 using an injection molding process. In one embodiment, the back portion 90 adheres to at least a portion of the inner portion 170. In another embodiment, the back portion 90 may adhere to at least a portion the front portion 50. In still another embodiment, the back portion 90 may adhere to at least of portion of the front portion 50 and at least a portion of the inner portion 170. In still another embodiment, the front portion 50, the back portion 90 or a combination of the front and back portions 50, 90 may encompass the first perimeter 118 of the first conductive member 110 and the second perimeter 138 of the second conductive member 130, thereby partially or fully sealing the mirror assemblies 30, 40. Encompassing the first perimeter 118 and the second perimeter 138 means substantially surrounding the outside edge of the first conductive member 110 and the second conductive member 130 with either the front portion 50, the back portion 90 or both the front and back portions 50, 90. In one embodiment, the front portion 50 substantially surrounds the first perimeter 118 and the second perimeter 138. In another embodiment, the back portion 90 substantially surrounds the first perimeter 118 and the second perimeter 138. In yet another embodiment, both the front portion 50 and the back portion 90 each at least partially surround the first perimeter 118 and the second perimeter 138. Partially sealing the mirror assemblies 30, 40 means having the front portion 50 and the back portion 90 in contact with each other around at least a portion of the first perimeter 118 and the second perimeter 138. Fully sealing the mirror assemblies 30, 40 means having the front portion 50 and the back portion 90 in contact with each other around substantially the entire first perimeter 118 and second perimeter 138. In one embodiment, the front portion 50 and the back portion 90 form a seam 96 on the outside surface 98 of the mirror assembly. The wire harness 120 may be inserted into the mold at different steps. In one embodiment, the wire harness 120 is inserted into the mold before the front portion 50 is inserted. In another embodiment, the wire harness 120 is inserted into the mold before the inner portion 170 is inserted. In yet another embodiment, the wire harness 120 is inserted into the mold before the back portion 90 is inserted. In still another embodiment, the wire harness 130 is already attached to the busbars 116, 136 before the first conductive member 110 and the second conductive member 130 are inserted into the mold.

Figure 8:
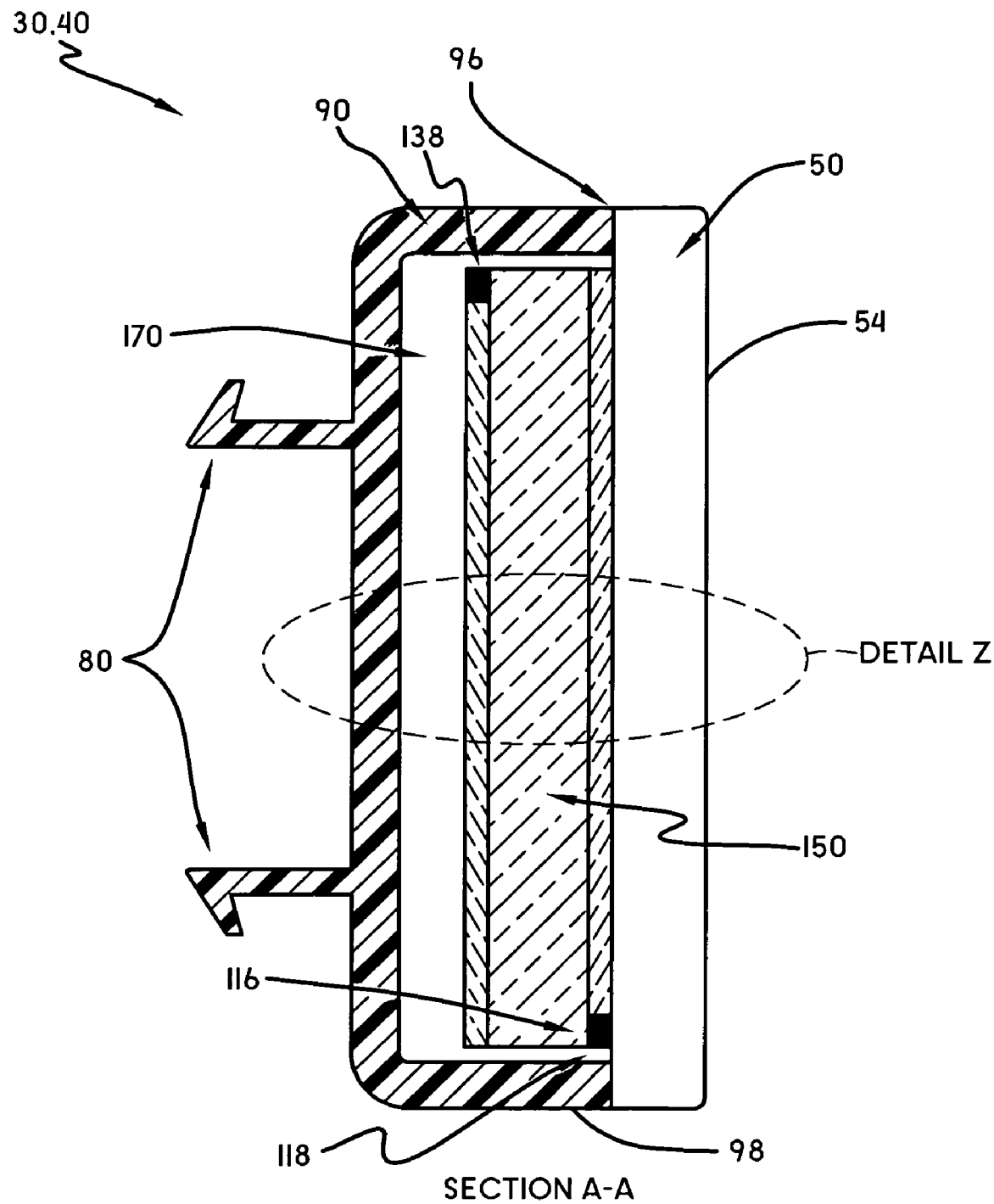
FIG. 8 is a sectional view of the mirror assembly taken along line A-A in FIG. 7.
Figure 9:
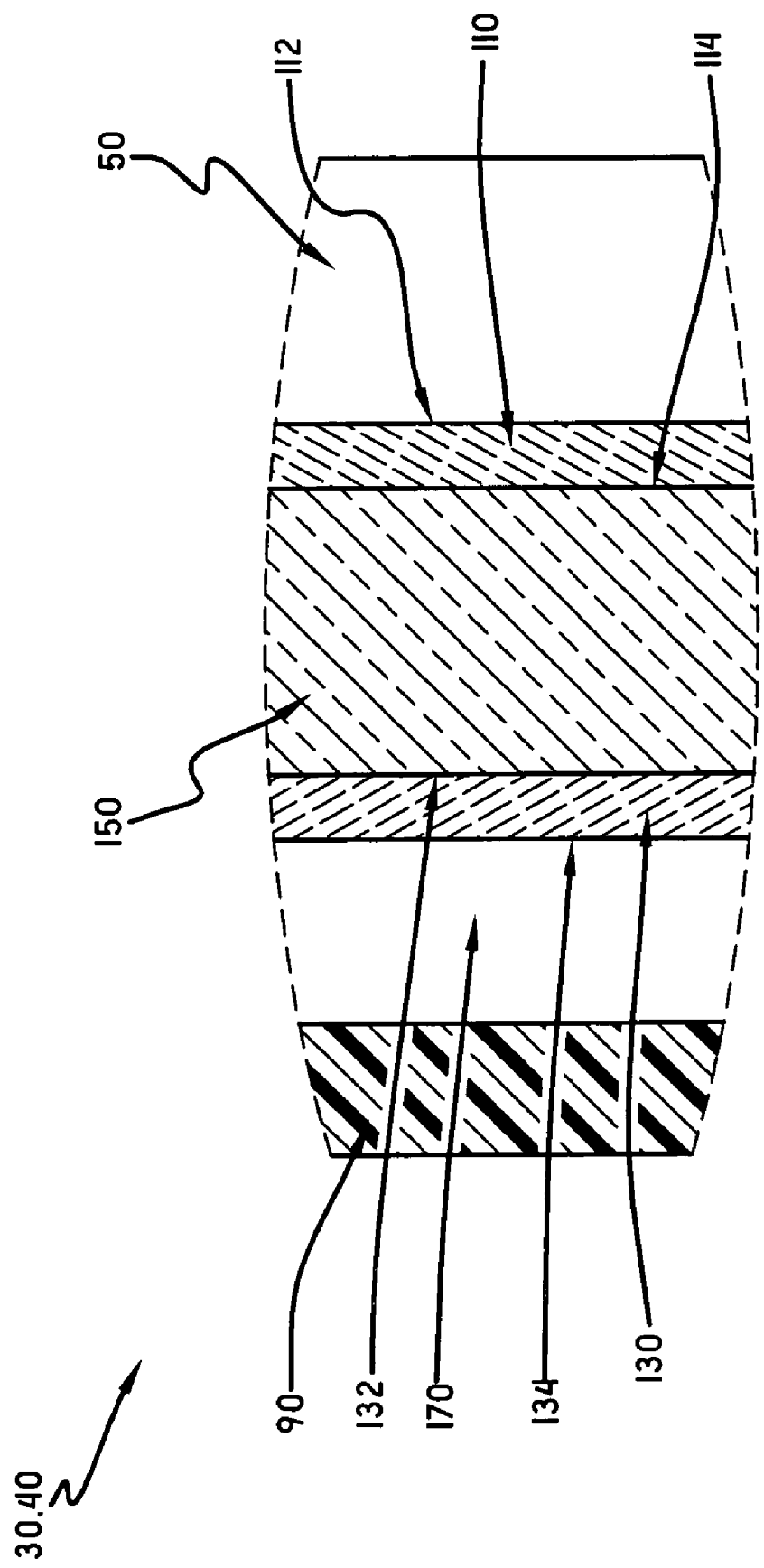
FIG. 9 is a sectional view of the mirror assembly taken from Detail Z in FIG. 8.
Figure 10:
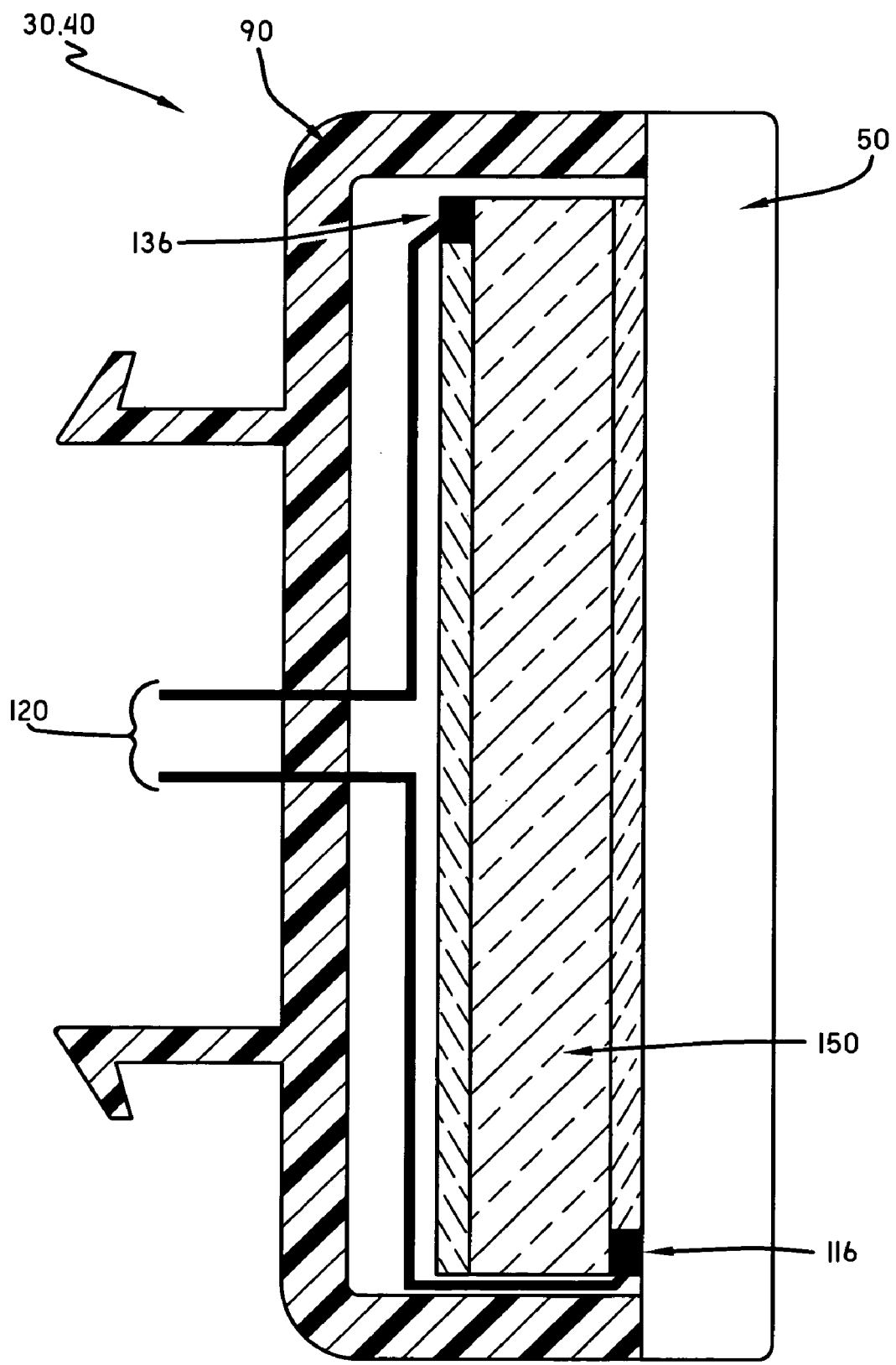
FIG. 10 is a side cut-away view of a mirror assembly made according to one embodiment of this invention.

With reference now to FIG. 8, when used with an exterior mirror assembly 30, a scratch resistant material 54 may be applied to at least a portion of the front portion 50 for use in protecting the front portion 50 from ice, snow, dirt, and other material that may contact an exterior mirror 30. In one embodiment, the scratch resistant material 54 is a coating that is applied by having the coating flow over at least a portion of the front portion 50. In another embodiment, the scratch resistant material 54 is any material chosen within sound engineering judgment and applied to at least a portion of the front portion 50.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A device comprising:
a mirror assembly comprising:
a first conductive member having a first side, a second side, a first perimeter, and a first busbar, wherein the first conductive member is substantially transparent;
a second conductive member having a first side, a second side, a second perimeter, and a second busbar, wherein the second conductive member comprises a reflective portion;
a third conductive member that is operatively connected to the first conductive member and the second conductive member and that is substantially transparent;
a front portion that is substantially transparent and that is formed by injecting a first thermoplastic material into a mold on the first side of the first conductive member;
an inner portion that is substantially transparent and that is formed by injecting a second thermoplastic material into the mold on the second side of the second conductive member; and
a back portion that is substantially opaque and that is formed by injecting a third thermoplastic material into the mold on the second side of the second conductive member, wherein the front portion and the back portion together substantially encompass the first perimeter and the second perimeter;
wherein the first thermoplastic material is a first polycarbonate material;
wherein the second thermoplastic material is a second polycarbonate material; and
wherein the third thermoplastic material is a third polycarbonate material.

2. The device of claim 1 further comprising:
a scratch resistant material covering at least a portion of the front portion.

3. The device of claim 1, wherein:
the back portion is formed within the mold to have an electrical connection that is operatively connected to the first and second busbars.

4. The device of claim 1, wherein:
the back portion substantially encompasses the first perimeter of the first conductive member and the second perimeter of the second conductive member and seals the assembly.

5. The device of claim 1, wherein:
the front portion substantially encompasses the first perimeter of the first conductive member and the second perimeter of the second conductive member and seals the assembly.

6. The device of claim 1, wherein:
the back portion is formed within the mold to have a first attachment portion for use in attaching the device to a vehicle.

7. A vehicle comprising:
a vehicle frame;
an engine supported to the vehicle frame;
at least one ground engaging wheel supported to the frame and operatively connected to the engine to provide locomotion to the vehicle;
a vehicle body supported to the frame and defining a passenger compartment; and,
a mirror assembly supported to the vehicle, the mirror assembly comprising:
a first conductive member having a first side, a second side, a first perimeter, and a first busbar, wherein the first conductive member is substantially transparent;
a second conductive member having a first side, a second side, a second perimeter, and a second busbar, wherein the second conductive member comprises a reflective portion;
a third conductive member that is operatively connected to the first conductive member and the second conductive member and that is substantially transparent;
a front portion that is substantially transparent and that is formed by injecting a first thermoplastic material into a mold on the first side of the first conductive member;

an inner portion that is substantially transparent and that is formed by injecting a second thermoplastic material into the mold on the second side of the second conductive member; and a back portion that is substantially opaque and that is formed by injecting a third thermoplastic material into the mold on the second side of the second conductive member, wherein the front portion and the back portion together substantially encompass the first perimeter and the second perimeter;

wherein the first thermoplastic material is a first polycarbonate material;

wherein the second thermoplastic material is a second polycarbonate material; and wherein the third thermoplastic material is a third polycarbonate material.

8. The vehicle of claim 7 wherein the mirror assembly further comprises:

a scratch resistant material covering at least a portion of the front portion.

9. The vehicle of claim 7, wherein:

the back portion is formed within the mold to have an electrical connection that is operatively connected to the first and second busbars.

10. The vehicle of claim 7, wherein:

the back portion is formed within the mold to have a first attachment portion for use in attaching the device to a vehicle.

11. The vehicle of claim 7, wherein:

the back portion is formed within the mold to have a second attachment portion for use in attaching the mirror assembly to the vehicle.

12. The vehicle of claim 7, wherein:

the first attachment portion is used to attach the mirror assembly to the exterior of the vehicle.

13. The vehicle of claim 7, wherein:

the first attachment portion is used to attach the mirror assembly to the interior of the vehicle.

14. A method of forming a minor assembly comprising the steps of:

(a) inserting a first conductive member into a mold, wherein the first conductive member comprises a first busbar and a first perimeter, wherein the first conductive member is substantially transparent when the minor assembly is used;

(b) inserting a first thermoplastic material into the mold to form a front portion on a first side of the first conductive member, wherein the front portion is substantially transparent when the mirror assembly is used;

(c) inserting a second conductive member into the mold, wherein the second conductive member comprises a second busbar, a second perimeter, and a reflective portion when the mirror assembly is used;

(d) inserting a second thermoplastic material into the mold to form an inner portion on a second side of the second conductive member, wherein the inner portion is substantially transparent when the mirror assembly is used;

(e) inserting a third conductive member into the mold wherein the third conductive member is operatively connected to the first conductive member and the second conductive member and is substantially transparent; and (f) inserting a third thermoplastic material into the mold on the second side of the second conductive member to form a back portion, wherein the back portion is substantially opaque when the mirror assembly is used, wherein the front portion and the back portion together substantially encompass the first perimeter and the second perimeter;

step (b) comprises the step of: injecting a first polycarbonate material into the mold;

step (d) comprises the step of: injecting a second polycarbonate material into the mold; and, step (f) comprises the step of: injecting a third polycarbonate material into the mold.

15. The method of claim 14 further comprising the steps of: applying a scratch resistant material to the front portion.

16. The method of claim 14 wherein:

step (f) comprises the step of: forming a back portion within the mold to have an electrical connection that is operatively connected to the first and second busbars.

17. The method of claim 14, wherein:

step (f) comprises the step of: sealing the assembly.

* * * * *